United States Patent
Landälv et al.

(10) Patent No.: US 7,294,225 B2
(45) Date of Patent: Nov. 13, 2007

(54) PROCESS FOR PRODUCTION OF SYNTHESIS GAS IN COMBINATION WITH THE MAINTENANCE OF THE ENERGY BALANCE FOR A PULP MILL

(75) Inventors: Ingvar Landälv, Kungsängen (SE); Mats Lindblom, Lidingö (SE)

(73) Assignee: Chemrec Aktiebolag, Stockholm (SE)

( * ) Notice: Subject to any disclaimer, the term of this patent is extended or adjusted under 35 U.S.C. 154(b) by 143 days.

(21) Appl. No.: 10/416,124

(22) PCT Filed: Nov. 15, 2001

(86) PCT No.: PCT/SE01/02543

§ 371 (c)(1),
(2), (4) Date: Sep. 5, 2003

(87) PCT Pub. No.: WO02/40768

PCT Pub. Date: May 23, 2002

(65) Prior Publication Data

US 2004/0055716 A1    Mar. 25, 2004

(30) Foreign Application Priority Data

Nov. 15, 2000    (SE) .................... 0004185

(51) Int. Cl.
*D21C 11/00*    (2006.01)
(52) U.S. Cl. .............. 162/16; 162/29; 162/30.1; 162/30.11; 162/47; 252/373; 423/648.1; 518/700
(58) Field of Classification Search ........... 252/373; 423/648.1; 48/197 R; 518/700; 162/30.1, 162/47, 16, 29, 30.11
See application file for complete search history.

(56) References Cited

U.S. PATENT DOCUMENTS 1,833,313 A * 11/1931 Bradley et al. ........... 162/36
3,920,717 A * 11/1975 Marion ................... 518/703
4,135,968 A * 1/1979 Dehaas .................. 162/30.1

(Continued)

FOREIGN PATENT DOCUMENTS

| | | | |
|---|---|---|---|
| SE | 319 375 | | 1/1970 |
| SE | 319375 B | * | 1/1970 |
| WO | WO 0127384 A1 | * | 4/2001 |

OTHER PUBLICATIONS

Owen, Keith et al, Automotive Fuels Reference Book, 1995, Society of Automotive Engineers, Inc., 2nd Edition, pp. 540-543 & 552.*

(Continued)

*Primary Examiner*—Mark Halpern
(74) *Attorney, Agent, or Firm*—Jeffrey S. Melcher; Manelli Denison & Selter, PLLC

(57) ABSTRACT

A process (44) for the production of pulp and paper (28), recycling of cooking chemicals (3, 29), combustion of biomass (30, 37) and generation of heat and electric energy (27, 40) comprising a pulp and paper mill (28), in that the part of the process which is recycling cooking chemicals is adjusted from combustion (29) to gasification (3) to generate synthesis gas (14); and that biomass is added (33, 39) in an amount sufficient for compensating of the decrease in heat and electricity generation as a consequence of the generation of synthesis gas (14).

25 Claims, 5 Drawing Sheets

U.S. PATENT DOCUMENTS

| | | | | |
|---|---|---|---|---|
| 4,699,632 | A | * | 10/1987 | Babu et al. ............... 48/197 R |
| 4,808,264 | A | * | 2/1989 | Kignell ...................... 162/30.1 |
| 5,370,771 | A | * | 12/1994 | Nilsson ...................... 162/30.1 |
| 5,507,141 | A | * | 4/1996 | Stigsson ...................... 60/775 |
| 5,753,716 | A | | 5/1998 | Peng et al. |
| 5,855,737 | A | * | 1/1999 | Seidel et al. ............. 162/30.11 |
| 6,030,493 | A | * | 2/2000 | Nilsson ...................... 162/30.1 |
| 6,063,355 | A | * | 5/2000 | Fujimura et al. ........... 423/359 |
| 6,143,130 | A | * | 11/2000 | Stigsson et al. .............. 162/29 |
| 6,211,254 | B1 | * | 4/2001 | Whitney ..................... 518/704 |
| 6,605,647 | B2 | * | 8/2003 | Yamada et al. ............. 518/715 |
| 6,770,168 | B1 | * | 8/2004 | Stigsson ...................... 162/24 |

OTHER PUBLICATIONS

Marshall Brain, "How Car Engines Work", http://auto.howstuffworks.com/engine1.htm, Nov. 18, 2004, p. 1.*

Andren, Martin; Martin, Viktoria; Svedberg, Gunnar, "Combined production of power and alternative fuels in connection with pulp mills", 1999, Proceedings of the Intersociety Energy Conversion Engineering Conference, 34th, pp. 107-113.*

Larson, E. D., Kreutz, T. G., and Consonni, S., "Combined Biomass and Black Liquor Gasifier/Gas Turbine Cogeneration at Pulp and Paper Mills", 1998, Proceedings of the 1998 International Gas Turbine & Aeroengine Congress & Exhibition, Paper 98-GT-349; ASME, Fairfield, NJ, pp. 1-7.*

Ahlroth, M., and Svedberg, G., "Case Study on Simultaneous Gasification of Black Liquor and Biomass in a Pulp Mill", 1998, Proceedings of the 1998 International Gas Turbine & Aeroengine Congress & Exhibition, Paper 98-GT-350; ASME, Fairfield, NJ, pp. 1-6.*

Teder A, "Tomorrow's Pulp", Jul.-Aug. 1995, World Pap., vol. 220, No. 7, p. 26.*

Ohlstrom, Mikael; Makinen, Tuula; Laurikko, Juhani; Pipatti, Riitta, "New concepts for biofuels in transportation. Biomass-based methanol production and reduced emissions in advanced vehicles", 2001, VTT Tiedotteita, 2074, p. 1-92.*

Li et al., Derwent abstract of CN 1203937, Jan. 1999, China.*

"Feasibility Phase Project for Biomass-Derived Alcohols for Automotive and Industrial Uses" Altener, (Sep. 1997).

"Technical and Commercial Feasibility Study of Black Liquor Gasification With Methanol/DME Production as Motor Fuels for Automotive Uses-BLGMF" Altener (Dec. 2003).

* cited by examiner

US 7,294,225 B2

PROCESS FOR PRODUCTION OF SYNTHESIS GAS IN COMBINATION WITH THE MAINTENANCE OF THE ENERGY BALANCE FOR A PULP MILL

This application is a 371 of PCT/SE01/0543 filed 15 Nov. 2001.

TECHNICAL FIELD

The present invention relates generally to the field of efficient production of synthesis gas for further conversion to products such as methanol, DME, hydrogen gas or other valuable chemicals, from biomass derived material and in particular to synthesis gas production in combination with the production of pulp and paper. More specifically, the present invention relates to the chemical recovery process and the overall energy balance for a pulp mill.

BACKGROUND OF THE INVENTION

The strong dependence on fossil fuels, more specifically crude oil, in the energy and transport sector where disturbances in the supply have great impact on the economies throughout the world has lead to increased activities in the search for alternative sources for energy.

The increased usage of fossil fuels leads to an increased level of carbon dioxide in the atmosphere, which is strongly believed to have an impact on the global climate. The so-called greenhouse effect is caused by the presence of certain gases such as carbon dioxide, water vapour and methane in the atmosphere. An increased concentration of these gas components in the atmosphere may have an impact of the temperature level and lead to globally warmer climate. Due to the continued and increased usage of fossil fuels the concentration of carbon dioxide increases steadily in the earth's atmosphere with possible severe consequences for economies and basis for life.

The search for reliable and ecologically sustainable solutions to the world's energy demands have been on-going since the first oil crisis in 1974. Conversion of renewable, biomass-based energy sources to electric power and to automotive fuels has however shown to be technically difficult and expensive and only a few real demonstrations have been realized.

The chemical pulping of wood and other lignocellulosic materials is a well-established process to produce pulp and paper products. The most common process is the kraft pulping process where sulphur-and sodium-based chemicals are used when digesting the wood chips into pulp. The invention is also applicable to other chemical pulping processes such as sodium carbonate based non-sulphur processes. At the outlet of the pulp mill's digester step the pulp is separated from the cooking chemicals and dissolved wood constituents of which the lignin is the major part. This separated stream is concentrated in a multi-effect evaporator system to a dryness of 65-85% and is called black liquor. This intermediate stream in a kraft mill is the key energy carrier and provides the major part of the energy required by the kraft process which is a large consumer of electric power and heat.

State-of-the-art technology in a kraft mill for recovery of the energy and the chemicals from the black liquor is to feed it to a recovery boiler, a so-called Tomlinson boiler, where the inorganic cooking chemicals are recovered as a smelt at the bottom of the boiler and withdrawn for recycling to the process and the organic material is combusted and the heat recovered as usable energy by generation of steam.

Existing Technoloay of Today—Recovery Boiler Technology

The chemical and energy recovery system for a state-of-the-art kraft mill is further described with reference to FIG. 2. The thickness of the streams in this figure as well as in FIGS. 3-6 indicates relative quantities of energy bound to the streams in the various processes.

Pulp wood (19) is brought into the mill and is freed from bark before being chopped Into wood chips for further processing. The bark stream (20), is fed to a biomass fired power boiler (30). In the mill process (28) the wood chips are converted into pulp (if the plant only produces pulp it is a so-called non-integrated mill) or into paper (if the plant is a combined pulp and paper mill, a so-called integrated mill) (22). The non-pulp elements of the wood together with the cooking chemicals together form a thin black liquor which is concentrated in an evaporation plant to a dryness of 65-85% and called black liquor (23) and is then fed to the recovery boiler (29). In the recovery boiler (29) the cooking chemicals are separated and thereafter recycled to the mill process in the form of so-called green liquor (24) at the same time as the energy in the black liquor is converted to steam (25). Low temperature non-recoverable energy leaves the system through the recovery boiler stack (31).

To create balance between energy demand and supply for the mill process, steam is brought to the process via stream (27). The energy required comes from the recovery boiler (29) through stream (25) and from the power boiler (30) through stream (26). To keep the energy in the entire system in balance, an extra amount of biomass needs to be brought to the power boiler (30) on top of what is brought there in terms of bark (20) coming from the wood (19). This stream is shown as stream (21). The total need of biomass derived feedstock to the mill in the form of wood for pulping and biomass for energy generation is therefore the sum of streams (19), (20) and (21). If the mill is non-integrated, the bark (20) is often sufficient to make up for the energy balance.

Technology for the Replacement of the Recovery Boiler

Over the past 25 years there have been a number of developments going on to improve the energy recovery of the kraft pulp process by moving from the current recovery boiler based technology to a concept involving a pressurized gasification reactor. The black liquor stream is thus only partially oxidized or gasified to a combustible gas instead of being completely burnt. Such a concept is e.g. described in the publication by Berglin et al. 2nd Biennal Johan Gullichsen Colloqium, Helsinki, Finland, Sep. 9-10, 1999, and a preferred embodiment describing the gasification reactor configuration is described in U.S. Pat. No. 4,808,264. These two documents are included as references. The system is commonly referred to as a BLGCC system, an abbreviation for Black Liquor Gasification Combined Cycle.

The BLGCC system combines the pressurized gasification with firing of the combustible gas in a gas turbine, which in turn is combined with a waste heat boiler and a steam turbine together comprising a so-called combined cycle (CC). The inclusion of a BLGCC system in a pulp mill increases the overall energy yield by about 10 percentage points at the same time as the yield converted to electric power almost doubles compared with the performance of a modem recovery boiler.

The chemical and energy recovery system of a mill including a BLGCC system is further described with reference to FIG. 3.

Pulp wood (19) is brought into the mill and is freed from bark before being chopped into wood chips for further processing. The bark is fed to a biomass fired power boiler (30). In the mill process (28) the wood chips are converted to pulp and paper (22). The non-pulp elements of the wood together with the cooking chemicals together form a thin black liquor which is concentrated to a dryness of 65-85% and called black liquor and then fed to an evaporation plant and then fed to the BLGCC system (32). The gasification process within the BLGCC system separates and recycles the cooking chemicals in the form of so called green liquor (24) to the mill process (28). In the BLGCC process, the sulphur in the gas is separated out and brought back to the mill process in stream (35) before the clean gas is fed to the gas turbine. The hot exhaust gas from the gas turbine is utilized to produce high-pressure superheated steam, which is fed to a steam turbine before the cooled exhaust stream is emitted to the atmosphere through stream (36).

As mentioned above the total production of power from a mill incorporating a BLGCC system is close to twice as high as for the corresponding recovery boiler solution as per FIG. 2 and the BLGCC based concept will be a net exporter of power. Power is exported through stream (34). Due to the higher power production there is a lower steam supply from the BLGCC system back to the mill in stream (25) compared with the recovery boiler case. The requirement of energy (27) to the mill (28) is however the same as for a mill combined with a recovery boiler (29) and therefore the production of steam in stream (26) from the power boiler (30) must be increased by the corresponding amount. Additional biomass must therefore be brought to the power boiler (30) in stream (33).

The total need of biomass derived feedstock in the form of wood for pulping and biomass for energy generation for a mill having a BLGCC system is therefore the sum of streams (19), (20), (21) and (33) where the three first streams are identical to the case for a mill combined with a recovery boiler.

A State-of-the-Art Technology for Methanol Production

DE-A1-1517207 discloses a process for methanol production by black liquor gasification.

Commercial methanol production is based on synthesis gas produced by gasification of heavy oil, coal and natural gas.

Conversion of renewable feedstocks such as lignocellulosic types of biomass to methanol has been investigated in a large number of studies since the early 1980's. FIG. 1 shows a biomass to methanol production plant comprising the following process steps: Biomass (8) enters the biomass feedstock drying and handling (1), air separation (2) to produce pure oxygen (10), pressurized gasification with oxygen to produce a synthesis gas (3), synthesis gas cooling (4), synthesis gas purification (5), synthesis gas conditioning (6), methanol synthesis (7). All listed process steps are well established except for the conversion of biomass through gasification with oxygen which has been tested only in pilot scale and during short periods.

The conversion of biomass to methanol can be carried out according to two main principles which the first can be designated as a methanol only route, concept A, and the second as a methanol plus by-product route, concept B.

Concept A is illustrated with the seven process steps shown in FIG. 1. The conversion efficiency from biomass to methanol is, with reference to above studies, approximately 50% and may reach a few percentage points higher when further optimized.

Pressurised gasification of solid biomass (3) has some challenging features which need further development to reach commercial status and that may turn out to be severe obstacles to the realization of the total concept.

The introduction of biomass under pressure (9) requires a special feeding system working with a pressurizing gas (17) which must be as compatible as possible for the downstream methanol synthesis (7) in order to minimize the size of the bleed out stream (16) from the methanol synthesis loop (7).

Gasification of solid biomass is normally carried out in a fluidized bed type of reactor with chopped biomass with a mean characteristic particle size of 5-50 mm. (Fixed bed reactors are normally limited to only 5 MWth/unit due to heat transfer.) Entrained flow reactors require a smoothly conveyable feedstock and woody biomasses are generally not pneumatically conveyable nor pumpable. Screw feeding is normally a preferred conveying method which can be used in fluidized beds using a protecting and inertisation gas that prevents hot material and gas from the reactor to enter the conveyor mechanism that can cause plugging.

Biomass generally have a low ash content (of about 1% weight) and when the ash contains enough alkali metals to can cause bed material agglomeration to cause plugging of the reactor may result or lead to fouling problems. The fluidised bed sand material must therefore be replaced. Loss of bed material also occurs by attrition (particle erosion) and elutriation (loss of fine part of particle fraction via the cyclone gas stream.) Spent bed materials may have to be safely deposited as they can contain leachable hazardous components.

For the reason of the bed material agglomeration risk described above, the reactor temperature is limited to around 900° C., which is a moderate temperature that often results in the formation of undesirable by-product tars. The formed tars undergo secondary cracking producing methane and olefins, which are generally not stable at 900° C. but are produced by radical tar cracking. As long as tar components are present in the gas they will be accompanied by a quantity of methane which is quite higher than the equilibrium level.

The gasification reactions in the gasifier (3) thus produce methane and other higher hydrocarbons in the raw synthesis gas (11). Methane constitutes a large share of the energy content of said raw gas and in concept A, the methane needs to be converted to synthesis gas and further into methanol. This conversion is a known process step (6) but means that more processing steps must be added leading to a more complex configuration of concept A.

The ratio between the two synthesis gas molecules carbon monoxide and hydrogen needs to be adjusted in order to maximize methanol production. This is also accomplished in the gas conditioning step (6) and interferes negatively with the methane conversion to synthesis gas.

The conditioning step (6) requires, a feed gas (13) low in carbon dioxide in order to supply the methanol synthesis (7) with an optimum gas composition for maximum methanol yield.

The formation of higher hydrocarbons needs to be minimized or a method for their elimination or capture needs to be included In the plant concept.

An alterative route here, concept B, would overcome the above listed difficulties with concept A. Concept B can be described as a methanol and by-product route, which simplifies the process configuration.

The methanol and by-product route can be described using FIG. 1 with the following changes compared to concept A. The gas conditioning step (6) is eliminated which means that no conversion of methane into synthesis gas is carried out and preferably no adjustment of the ratio between carbon monoxide and hydrogen is made. As a consequence the need for bleed out of gas (16) from the methanol synthesis (7) loop increases.

The conversion of biomass to methanol in concept B is approximately 25% and the total energy yield of methanol plus bleed out gas is approximately 60%. This means that the yield of methanol has come down to about half compared to concept A but the total yield of products, methanol and energy rich gas, have increased.

With a liquid feedstock such as black liquor, the pressurization step of the gasifier feedstock stream can be performed by a simple pump instead of a complex system of lock hoppers that are necessary for solid fuel feeding systems according to prior art processes and systems for production of e.g. methanol. The burner system of the gasifier reactor can also be simplified when fed with a pumpable liquid instead of a solid feedstock.

Depending on the properties of feedstock the gasifier reactor principle can also be altered to optimize the conversion of the fuel to synthesis gas. As a consequence the methane concentration drastically decreases to a level which can be accepted without further treatment as described earlier for concept A.

The generation of higher hydrocarbons is also suppressed due to the favorable conditions for synthesis gas generation In the case of a black liquor gasifier.

It is well known from many methanol production schemes where the feedstock is a sulphur-rich heavy oil fraction or coal that the gas cleaning step must be of advanced nature in order to protect the sensitive methanol catalyst In the methanol reactor from poisoning and degradation. The synthesis gas from the black liquor gasification step contains sulphur components in the form of hydrogen sulphide and carbonyl sulphide and it also contains carbon dioxide, traces of higher hydrocarbons and possibly other traces which can be harmful for the methanol synthesis step. Technology suited to meet the high quality demand for methanol synthesis gas is available and commercially proven technology. Such gas purification processes generate by-product streams well suited to be integrated into the mill process with the potential to enhance the yield from and the performance of the kraft process. One such integration benefit is described in EP-B1-0903436.

SUMMARY OF THE INVENTION

It is the objective of the present invention to create a new combination of processes that can produce synthesis gas from biomass derived fuels in a simpler and in a more energy efficient way than what state-of-the-art technology has the potential to do. Preferably, the biomass fuels can be different types of low quality such as forestal waste, refuse derived fuels, bark or similar.

To overcome the current problems with the state-of-the-art biomass-to-methanol technology there is need of process development as previously described. An alternative way to overcome such problems would be to make an alteration of feedstock such that the biomass gasification step would produce a gas more suitable for methanol production. The kraft pulping process in this aspect offers a unique combination of features as it is optimized to withdraw a maximum amount of the wood fibers for paper pulp production at the same time as it produces a biomass derived, energy rich stream in liquid state, so-called black liquor.

The combination of the features of the kraft pulping process with its intermediate, energy rich black liquor stream, the special requirement of the synthesis gas when producing methanol and the presence of a large biomass fired boiler at the mill site, offers a high potential of energy conservation which allows the methanol to be produced from biomass in an exceptionally energy efficient manner. At the same time, the combination results in other positive synergy for the pulp mill with potential for increased pulp yield from the kraft pulp process.

The black liquor gasification as well as the synthesis steps according to the process of the present invention are carried out during pressurized conditions. The black liquor gasification is suitably carried out at a pressure around or above 20-25 bar, since a lower pressure results in an energy loss of the recoverable heat which is evolved in the gasifier reactor. On the other hand, technical conditions constrain the upper limit for the pressure. The synthesis step, such as e.g. methanol synthesis, is preferably carried out in the range from about 60 bar up to about 80 bar.

The process according to the present invention presents a solution to the above mentioned problems by providing a process for the production of pulp and paper, recycling of cooking chemicals, combustion of biomass and generation of heat and electric energy comprising a pulp and paper mill, in that the part of the process which is recycling cooking chemicals is adjusted from combustion to gasification to generate synthesis gas; and that biomass is added in an amount sufficient for compensating for the decrease in heat and electricity generation as a consequence of the generation of synthesis gas.

The process of the present invention is particularly advantageous for production of synthesis gas, preferably for further processing into products such as methanol, DME, hydrogen gas or other valuable chemicals and/or automotive fuels. The invention particularly relates suitably to the conversion of lower quality biomass derived feedstocks. The process facility related to the invention is conveniently to be physically located close to a kraft mill facility producing chemical pulp for papermaking.

In today's existing integrated pulp mills there is a deficit of energy in the form of heat and electricity and the required extra energy supplied to the mill is often bark, oil or natural gas for boiler firing and electric power from the electric grid. With the process according to the present invention, the energy deficit will increase due to the withdrawal of a new energy rich product stream from the system. The deficit of electric power and heat will be met by feeding additional biomass derived energy material to the system. With this combination of processes, lower grade energy resources, like forestry waste wood, can be upgraded to high quality energy products like methanol, DME or hydrogen through efficient energy conservation, preferably within the system.

Preferably, the process according to the present invention comprises a production of synthesis gas for further processing into methanol, DME, hydrogen or other valuable chemicals from biomass derived material.

According to a preferred embodiment the process of the present invention relates to a process wherein said synthesis gas is converted to methanol, comprising combinations of the following processes, in which the second process below is not directly involved:

A first process for conversion of wood to produce pulp utilizing cooking chemicals containing sodium and sulphur based salts and also co-producing a biomass derived, energy rich stream containing spent cooking chemicals;

A second process for conversion of the energy in said stream to usable energy for the first process and recycle of said cooking chemicals to the first process;

A third process for conversion of the energy in said stream to methanol and usable energy for the first process and recycle of said spent cooking chemicals to the first process;

A fourth process for conversion of biomass derived material to heat and electric energy;

A fifth process for conversion of biomass derived material to electric energy;

where in an original configuration comprising the first, second and fourth processes, the energy required for operation of said original configuration is partly brought to the configuration from the second process where said energy rich stream from the first process is converted to heat and electric energy and partly by conversion of said biomass derived material brought to the fourth process where said material is converted to heat and electric energy for said original configuration, in that, when the second process is replaced by the third process to become an alternate configuration and energy in said spent cooking chemicals from the first process therefore in part is converted to methanol and withdrawn from said alternate configuration, additional biomass derived energy is brought to said alternate configuration after being converted to heat and electric energy in the fourth process and to electric energy in the fifth process so that the total requirement of heat and electric energy for said alternate configuration is met at an equal level as in said original configuration.

According to yet another embodiment, the energy withdrawn from said alternate configuration in the form of methanol corresponds to at least 60% of the energy contained in said additional biomass brought to said alternate configuration to compensate for the withdrawal of said methanol.

Suitably, according to yet a further embodiment, sulphur components, such as sulphide and other sulphur components, are removed from the syntheses gas, preferably to a concentration below about 0.1 ppm, and recycled to the mill process in a highly concentrated stream.

In another embodiment, the chemical produced from, the third process can instead be DME (Di methyl ether) which is produced in a process closely similar to the methanol, synthesis but with a different catalyst and just slightly different process conditions. In such a case, the energy withdrawn from said alternate configuration in the form of DME production suitably corresponds to at least 60% of the energy contained in said additional biomass brought to said alternate configuration to compensate for the withdrawal of said DME.

As an alternative, the chemical produced from the third process can instead of methanol or DME also be hydrogen of high purity. In such a case, the energy withdrawn from said alternate configuration in the form of hydrogen production corresponds suitably to at least 60% of the energy contained in said additional biomass brought to said alternate configuration to compensate for the withdrawal of said hydrogen.

Conveniently, the fifth process for conversion of biomass derived material to electric energy can be located at a remote location from said alternate configuration and that said electric energy is brought to the alternate configuration via an electric distribution grid.

The process of the present invention can be applied in any pulp and paper process, but is preferably carried out with the production of pulp and paper through the kraft pulping process.

The invention is abbreviated BLGSF which stands for Black Liquor Gasification with synthetic fuels generation.

BRIEF DESCRIPTION OF THE DRAWINGS

Preferred embodiments of the present invention will now be described by way of example, with reference to the attached drawings, by no way restricting the present invention thereto, wherein.

DETAILED DESCRIPTION OF THE INVENTION

Figure 1:
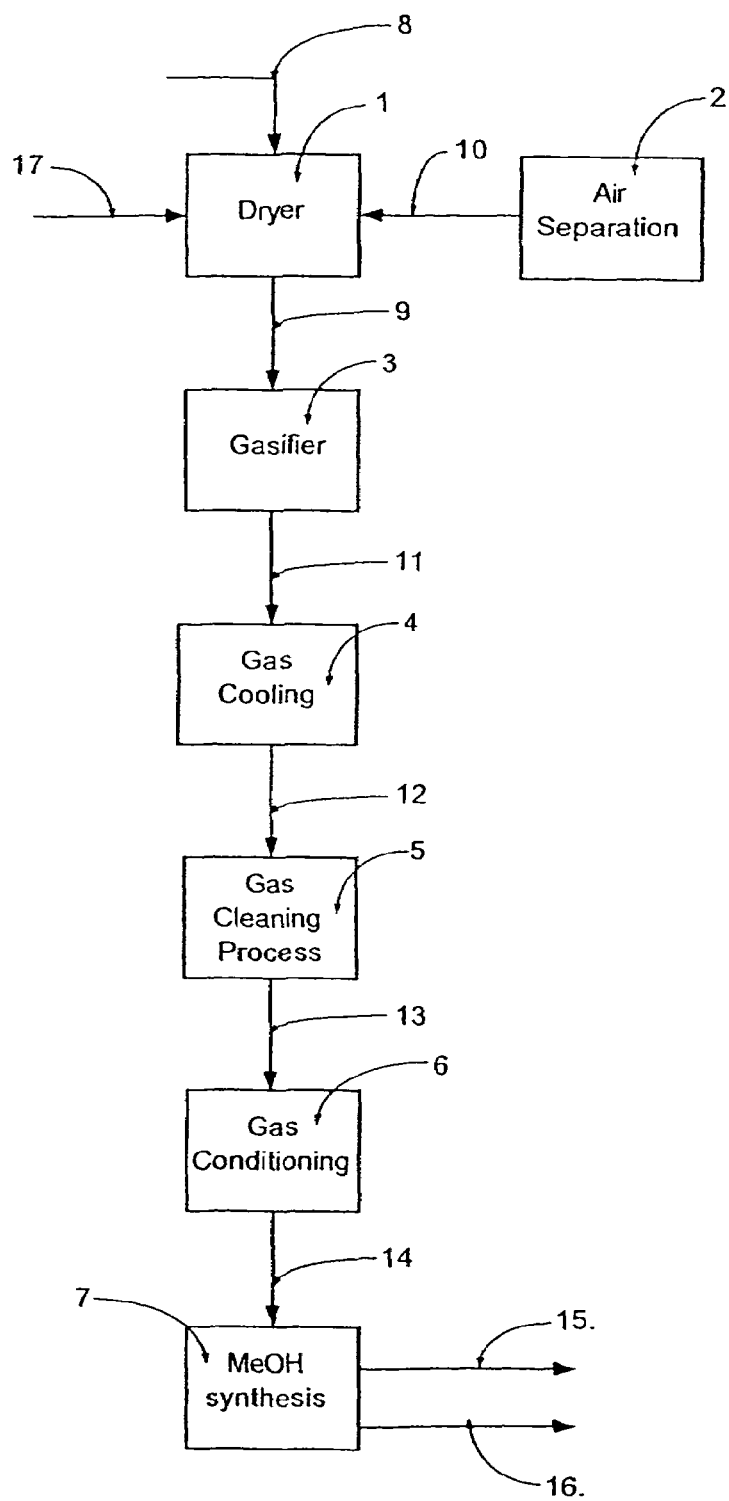
FIG. 1 illustrates in a diagram the state-of-the-art technology for biomass conversion to methanol.
Figure 2:
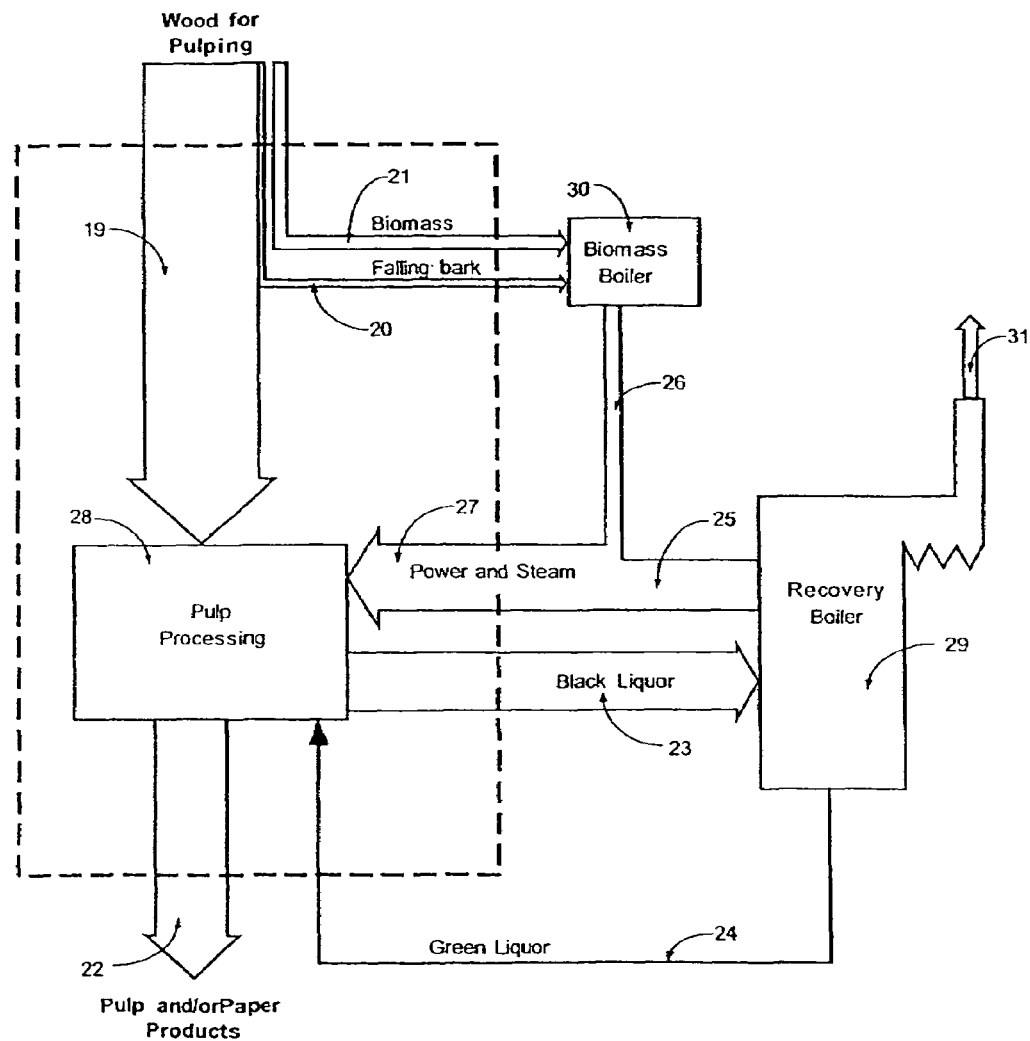
FIG. 2 illustrates in a flow diagram the state-of-the-art pulp and paper mill technology.
Figure 3:
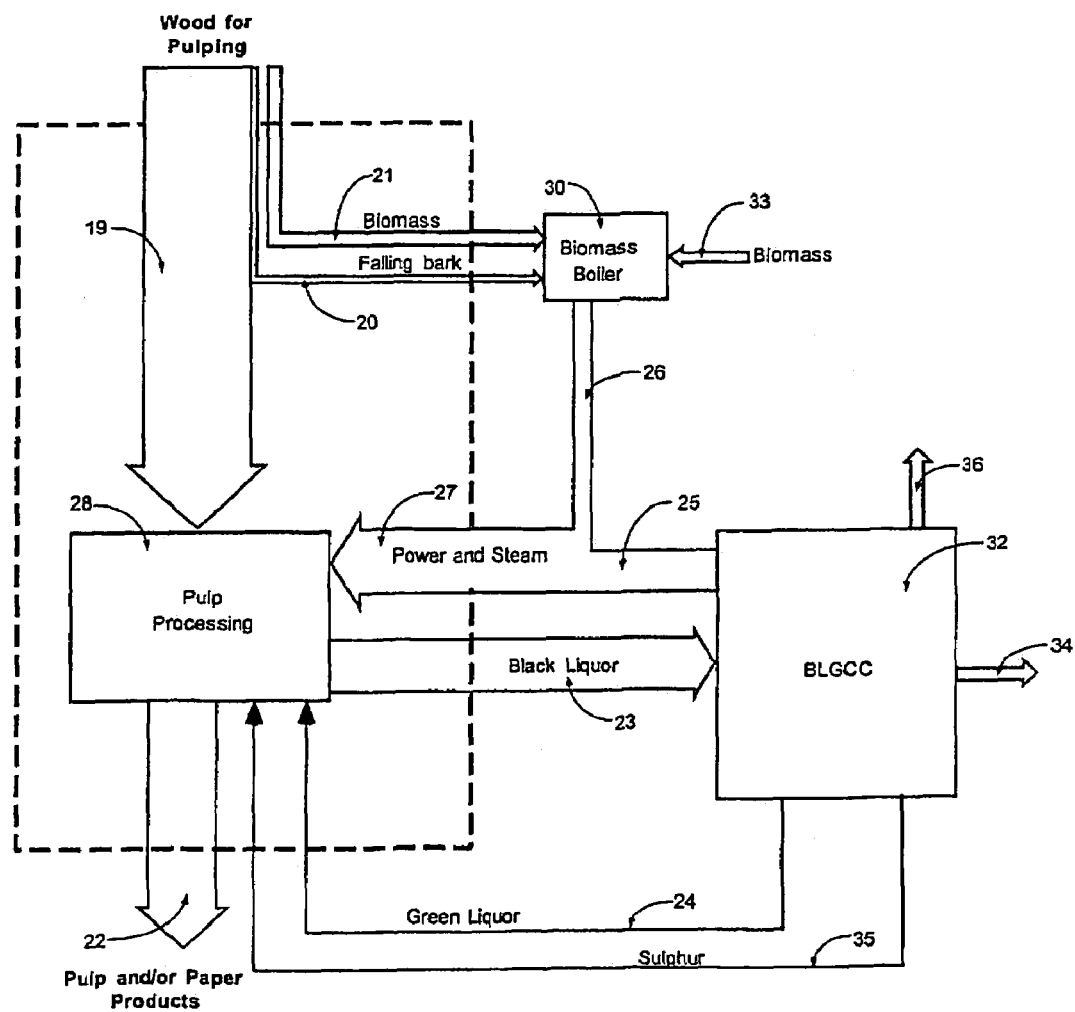
FIG. 3 illustrates in a flow diagram a pulp and paper mill including BLGCC technology for black liquor conversion.

As already discussed above in the background of the invention, the state-of-the-art technology for biomass conversion to methanol is shown in FIG. 1, today's technology for black liquor conversion is shown in FIG. 2, and the BLGCC technology for black liquor conversion is shown in FIG. 3.

The chemical and energy recovery system combined with methanol production is described with reference to FIG. 4. The methanol production process 38 is identical with FIG. 1 with feedstock drying step 1 eliminated.

Pulp wood 19 is brought into the mill and is freed from bark before being chopped into wood chips for further processing. The bark is fed to a biomass fired power boiler 30. In the mill process 28, the wood chips are converted to pulp and paper 22. The non-pulp elements of the wood together with the cooking chemicals together form a thin black liquor which is concentrated in an evaporation plant and then fed to the BLGSF system 38. The gasification process within the BLGSF system 3, separates and recycles the used cooking chemicals in the form of so-called green liquor 24 to the mill process 28. The methanol production process 38 requires steam and power to produce the methanol product, stream 15. The conversion efficiency of synthesis gas to methanol is high, which results in that less heat can be recycled back to the mill process in stream 25 in comparison with the state-of-the-art configuration, FIG. 2., where a recovery boiler 29 is utilized for heat recovery.

The requirement of energy 27 to the mill 28 is however the same as for a mill combined with a recovery boiler and therefore the production of steam 26 from the power boiler 30 must be increased to compensate for the lower amount of heat in stream 25. Additional biomass is therefore brought to the power boiler 30 in stream 33.

In comparison to the two other presented cases, as shown FIG. 3, a mill combined with a BLGSF process will need additional electric power generation in order to reach the same degree of independence from importation of fuel and power supply from its surroundings. This is accomplished via the use of a biomass fed gasification plant combined with a so-called combined cycle operated in the condensing mode 37. The technology is commonly abbreviated biomass fed IGCC which stands for Integrated Gasification Combined Cycle and which is used to maximize the electric power efficiency.

Figure 4:
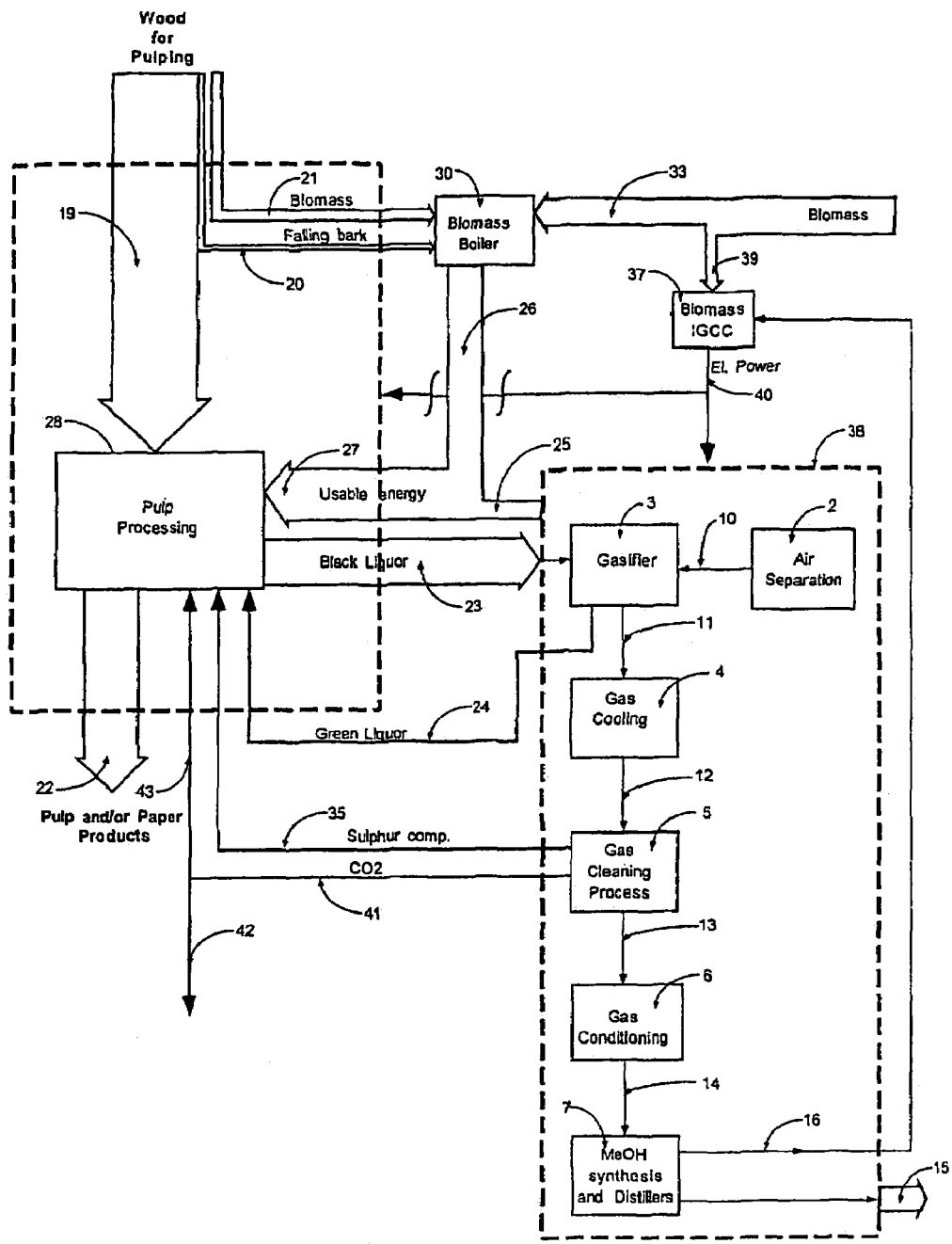
FIG. 4 illustrates in a flow diagram a pulp and paper mill including BLGSF technology for black liquor conversion.

In FIG. 4 the biomass needed for the extra power generation is fed to the biomass fed IGCC unit 37 through stream 39 together with bleed-out of purge gas 16 from the methanol synthesis step. The electric power is fed to the processes through stream 40.

The overall need of biomass derived feedstock, in the form of wood for pulping and biomass for energy generation for a mill incorporating a BLGSF system, is therefore the sum of streams 19, 20, 21, 33 and 39 where the three first streams are identical to the streams for a mill having a recovery boiler.

The utilization of energy for the three presented process systems is compared in Table 1 below, where the state-of-the-art pulp and paper mill with a recovery boiler, is used as reference level. For the two other process systems, the BLGCC and the BLGSF, Table 1 shows the alteration in energy fed to or taken out from the two alternatives compared to the state-of-the-art reference system.

TABLE 1

Comparison\*) of utilisable energy for BLGCC and BLGSF systems

|  | Intake of additional biomass, MW | Export of valuable Energy, MW | Efficiency: MW(prod.)/ MW(feed) |
|---|---|---|---|
| Pulp and Paper Mill combined with recovery boiler (reference system) | — | — |  |
| Pulp and Paper Mill combined with BLGCC | +51 (stream 33) | +35 (power, stream 34) | 0.68 |
| Pulp and Paper Mill combined with BLGSF | +210 (stream 33 + 39) | +141 (methanol, stream 15) | 0.67 |

\*)The figures in Table 1 are based on a production of 1000 ADT (air dried tonnes per day of paper pulp) corresponding to approximately 1800 tDS/d (tonnes per day of black liquor dry solids).

The presented example produces methanol from biomass with an energy efficiency of 67%, which is at least 15 percentage units higher than state-of-the-art technology and on the same level as the most energy efficient methanol technology existing today, namely methanol production from natural gas. The example is based on a conventional power boiler 30 with moderate performance for conversion of biomass to steam and further into electric power. If this boiler instead would be using high performance data the energy efficiency would approach 80%. In the example, the additional required electric power is produced at the same location in an advanced biomass fed IGCC power unit 37 to allow for comparison between the three process systems on equal basis. This power could as well be produced elsewhere. In such a case the bleed out gas 16 will be used in the power boiler 30 or in other energy consumers within the system. It is also possible to produce the required additional electric power in an enlarged biomass boiler 30 thus eliminating the biomass fed IGCC unit 37.

Figure 5:
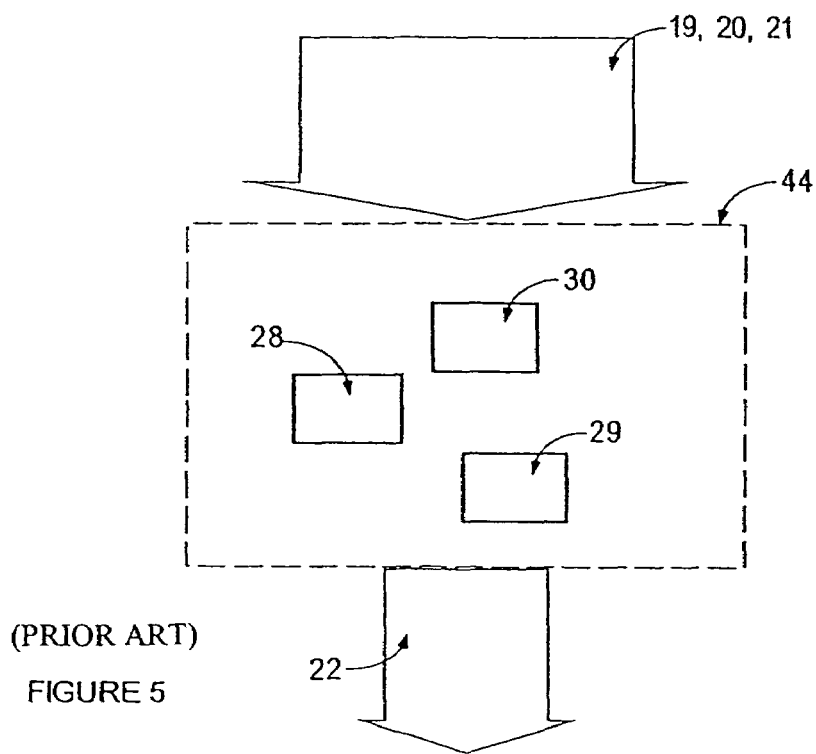
FIG. 5 illustrates in a flow diagram energy flow around a state-of-the-art pulp and paper mill.
Figure 6:
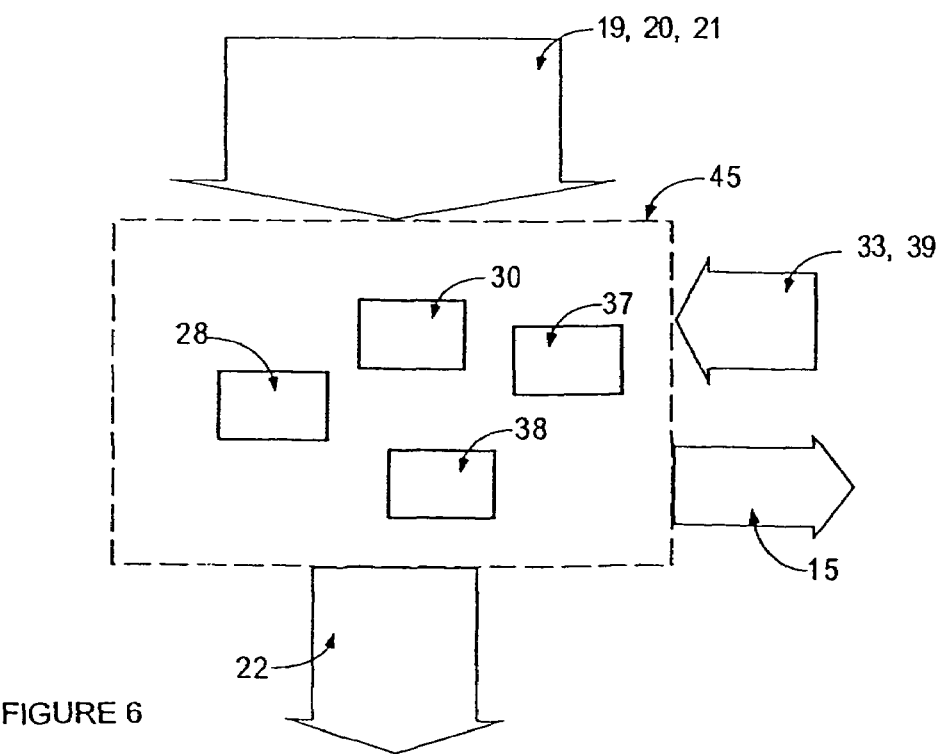
FIG. 6 illustrates in a flow diagram the energy flow around a pulp and paper mill integrated with methanol production from renewables.

To clarify Table 1, FIGS. 5 and 6 explain the overall energy flows to and from the state-of-the-art configuration 44 and the alternate BLGSF configuration 45 respectively. The dotted line represents the configuration boundary. In FIG. 5 streams 19, 20 and 21 together represent the biomass feedstock to the configuration and stream 22 the product. There can be an import or an export of electric power to/from the state-of-the-art configuration, FIG. 5. This is not part of the comparison and is therefore not shown in the figure as this only accounts for the changes in energy flows while going from state-of-the-art technology to the configuration representing the invention.

In FIG. 6 streams 19, 20, 21 and 22 are the same as in FIG. 5. When producing methanol 15 according to the invention, additional biomass 33 and 39 is required. The biomass is used to produce additional heat and electric power in units 30 and 37 to such a level that the alternate configuraton 45 has the same degree of independence of import of fuel and power supply from its surroundings as for the state-of-the-art configuration shown in FIG. 5. In the calculated case as per Table 1 the energy in the methanol stream 15 represents 67% of the energy brought to the configuration in streams 33 and 39. With a more efficient power boiler 30 than used in the presented example the energy efficiency can approach 80%.

Development work during the last decade in the field of replacing the recovery boiler has as previously described focused on the BLGCC concept. In most proposed concepts air has been used as oxidant in the gasifier resulting in the production of a diluted gas with a high concentration of nitrogen coming from the air. Lately there has been a shift in focus to instead use oxygen as this leads to a number of benefits.

One benefit with the use of pure oxygen is that the produced gas has such properties that it with reasonable means can be converted Into a synthesis gas for chemical synthesis. The quality of the gas differs significantly from that normally produced from a gasifier fed with solid biomass material and using oxygen as oxidant. Gasification of solid biomass in the form of chopped pieces of wood leads to excessive formation of methane and other higher hydrocarbons as previously mentioned in the section describing state-of-the-art methanol production from biomass. It can therefore be considered as a waste of a high quality intermediate process stream to just burn the synthesis gas from black liquor gasification in a gas turbine instead of using it as a high value feedstock to a chemical synthesis such as methanol, DME, hydrogen gas, ammonia and others.

The presented embodiment thus reveals a biomass feedstock upgrading scheme where the energy-rich black liquor stream is used as a valuable resource for high quality synthesis gas. The energy, which is converted to methanol and therefore not used as energy source for the mill process, is thus replaced by energy from low quality biomass feedstock fed to a standard power boiler and a biomass fed IGCC unit.

The preferred embodiment is further described with reference to FIG. 4. After withdrawal of green liquor 24 from the gasifier step 3 the untreated synthesis gas 11 is cooled in the gas cooling step 4 before further treatment. The present invention includes such advanced gas purification where the untreated synthesis gas 12 is cooled down to low temperatures, preferably below −40° C., before it is cleaned by washing with cooled methanol. This type of treatment has the advantage that it has the capability to separate out undesirable higher hydrocarbons excluding methane.

The proposed gas cleaning process 5 also has the capability to remove both hydrogen sulphide and carbonyl sulphide that are both present in the gas from the gasifier down to very low levels, <0.1 ppm, and to remove carbon dioxide down to the required level of 2-3% by volume in stream 13. Due to its ability to be very selective, the cleaning step 5 can recycle the sulphur components back to the mill process in a highly concentrated stream 35 and also produce a stream rich in carbon dioxide 41. Carbon dioxide may be useful within the mill process 28 as shown with stream 43 e.g. in the pulp bleaching section of the mill process. Carbon dioxide may also have a value as feedstock for the production of pure carbon dioxide for export while excess quantities 42 will be emitted to the atmosphere.

The sulphur containing stream 35 may also be converted to elemental sulphur e.g. in a so-called Claus process before the sulphur is recycled to the mill process. The Claus process is normally part of the gas cleaning step 5. Selection of the preferred route depends on the management of sulphur within the pulp mill.

The selection of technology for gas cleaning 5 has an impact on overall process reliability as well as on the ability of the BLGSF process to be a tool for mill process optimization. The low operating temperature of the process and the high selectivity when removing sulphur components and carbon dioxide are key contributors.

In the gas-conditioning step 6 the ratio between carbon monoxide and hydrogen is adjusted to become 0.5 by mole fraction in stream 14. This is done by letting a part of stream 13 run through a so-called shift reactor. In such a reactor water and carbon monoxide react to hydrogen and carbon dioxide over a catalyst under heat release. After the shift reactor the shifted gas needs to be purified from the produced carbon dioxide before said shifted stream is combined with the non-shifted stream to form the methanol feed stream 14.

An alternative route is to put the gas conditioning step 6 before the gas cleaning step 5 to avoid a second cleaning of the shifted stream as previously described. The preferred embodiment is however to put the gas conditioning step as described in FIG. 4.

Clean synthesis gas adjusted for methanol production is fed to the methanol synthesis in stream 14. To reach optimum conditions for methanol generation the pressure of the synthesis needs to be at 60-80 bar. According to the present invention, gasification 3 is preferably conducted at a pressure of approximately 30 bar and, therefore, further compression is preferably applied before the methanol synthesis 7. Gasification pressure can also be selected to be higher to avoid an extra compression step or lower due to other process considerations.

The methanol synthesis step 7 consists of a loop where non-reacted gas is recycled and mixed with fresh gas from step 6. The degree of recycle is depends on the amount of inert molecules in the feed and in the loop. Inert gas refers to those species not participating in the methanol formation reactions. Inert molecules are e.g. nitrogen and argon and partly methane. Carbon dioxide is participating in the reactions and its concentration needs also to be kept under control by bleeding out a part-stream of the recycle. Less inert gas in the feed leads to less bleed-out and therefore to a maximized methanol yield. The quality of the gas from the gasification step therefore plays a key role to accomplish high yield. The methanol stream 15 is of quality called "topped", which generally means approximately 97-98% purity and that can be used as a low additive to gasoline. If a 100% pure methanol is desired a distillation unit can be added for a complete removal of water.

Although the invention has been described with regard to its preferred embodiments, which constitute the best mode presently known to the inventors, it should be understood that various changes and modifications as would be obvious to one having the ordinary skill in this art may be made without departing from the scope of the invention as set forth in the claims appended hereto.

The invention claimed is:

1. A pulp mill process for production of pulp and an automotive fuel comprising:
   producing pulp and a liquid stream containing spent cooking chemicals in a pulp mill;
   gasifying a major portion of said stream of spent cooking chemicals to produce a synthesis gas and a liquor containing a portion of the spent cooking chemicals;
   recycling at least a portion of the liquor to the step of producing pulp;
   combusting additional biomass to generate heat and electric energy for the pulp mill process;
   processing at least a portion of the synthesis gas to produce automotive fuel comprising at least one selected from the group consisting of methanol and dimethyl ether, wherein the energy content of said automotive fuel corresponds to at least 60% of the energy content of said biomass, and wherein the additional biomass is added in an amount sufficient to compensate for a decrease in heat and electricity generation as a consequence of the generation of the synthesis gas; and
   exporting the automotive fuel from the pulp mill and using the fuel as alternatives to fossil based automotive fuels.

2. The process according to claim 1, wherein the automotive fuel is methanol.

3. The process according to claim 1, wherein the automotive fuel is dimethyl ether.

4. The process according to claim 1, further comprising cooling the synthesis gas to below −40 C and cleaning the synthesis gas.

5. The process according to claim 4, further comprising cleaning the synthesis gas in methanol.

6. The process according to claim 1, further comprising removing sulphur components from the synthesis gas and recycling the sulphur compounds to the pulp producing step in a highly concentrated stream.

7. The process according to claim 6, further comprising removing carbon dioxide from the synthesis gas during cleaning to a concentration below 3% in the synthesis gas.

8. The process according to claim 1, further comprising separate steps of combusting biomass to generate steam and combusting biomass to generate electricity.

9. The process according to claim 1, wherein the step of combusting biomass to generate at least part of the required electricity is located at a remote location from the location where the pulp is produced.

10. The process according to claim 9, wherein the combustion of additional biomass to generate electricity comprises an integrated gasification combined cycle unit.

11. The process according to claim 1, wherein all of said stream of spent cooking chemicals is gasified.

12. The process according to claim 1, wherein the biomass comprises at least one biomass selected from the group consisting of forestall waste, refuse derived fuels, and bark.

13. A pulp mill process for production of pulp and an automotive fuel comprising:
producing pulp and a liquid stream containing spent cooking chemicals in a pulp mill;
gasifying a major portion of said stream of spent cooking chemicals to produce a synthesis gas and a liquor containing a portion of the spent cooking chemicals;
recycling at least a portion of the liquor to the step of producing pulp;
combusting additional biomass to generate heat and electricity for the pulp mill process;
processing at least a portion of the synthesis gas to produce automotive fuel comprising at least one fuel selected from the group consisting of methanol and dimethyl ether, wherein the additional biomass is added in an amount sufficient to compensate for a decrease in heat and electricity generation as a consequence of the generation of the automotive fuel; and
exporting the automotive fuel from the pulp mill and adding the automotive fuel to gasoline.

14. The process according to claim 13, further comprising cooling the synthesis gas to below −40 C and cleaning the synthesis gas.

15. The process according to claim 14, further comprising cleaning the synthesis gas in methanol.

16. The process according to claim 13, further comprising removing sulphur components from the synthesis gas and the removed sulphur compounds are recycled to the pulp producing step in a highly concentrated stream.

17. The process according to claim 13, further comprising cleaning the synthesis gas and removing carbon dioxide to a concentration below 3% in the synthesis gas.

18. The process according to claim 13, further comprising separate steps of combusting biomass to generate steam and combusting biomass to generate electricity.

19. The process according to claim 18, wherein the step of combusting biomass to generate electricity is located at a remote location from the location where the pulp is produced.

20. The process according to claim 18, wherein the combustion of additional biomass to generate electricity comprises an integrated gasification combined cycle unit.

21. The process according to claim 13, wherein the biomass comprises at least one biomass selected from the group consisting of forestall waste, refuse derived fuels, and bark.

22. A pulp mill process for production of pulp and an automotive fuel comprising:
producing pulp and a liquid stream containing spent cooking chemicals in a pulp mill;
gasifying a major portion of said stream of spent cooking chemicals to produce a synthesis gas and a liquor containing a portion of the spent cooking chemicals;
recycling at least a portion of the liquor to the step of producing pulp;
combusting additional biomass to generate heat and electric energy for the pulp mill process;
processing at least a portion of the synthesis gas to produce automotive fuel comprising dimethyl ether, wherein the energy content of the automotive fuel corresponds to at least 60% of the energy content of said biomass, and wherein the additional biomass is added in an amount sufficient to compensate for a decrease in heat and electricity generation as a consequence of the generation of the automotive fuel; and
exporting the automotive fuel from the plant.

23. A pulp mill process for production of pulp and an automotive fuel comprising:
producing pulp and a liquid stream containing spent cooking chemicals in a pulp mill;
gasifying a portion of said stream of spent cooking chemicals to produce a synthesis gas and a liquor containing a portion of the spent cooking chemicals;
recycling at least a portion of the liquor to the step of producing pulp;
combusting additional biomass to generate heat and electric energy for the pulp mill process;
processing at least a portion of the synthesis gas to produce automotive fuel comprising at least one selected from the group consisting of methanol and dimethyl ether, wherein the energy content of said automotive fuel corresponds to at least 60% of the energy content of said biomass, and wherein the additional biomass is added in an amount sufficient to compensate for a decrease in heat and electricity generation as a consequence of the generation of the synthesis gas; and
using the fuel as alternatives to fossil based automotive fuels.

24. Process according to claim 23, wherein methanol is produced as the automotive fuel and used as an alternative to gasoline.

25. Process according to claim 23, wherein dimethyl ether is produced as the automotive fuel and used as an alternative to diesel.

* * * * *